United States Patent
Skultety-Betz et al.

(10) Patent No.: US 7,894,043 B2
(45) Date of Patent: Feb. 22, 2011

(54) HAND-HELD DISTANCE MEASURING DEVICE WITH STATIC UNIT AND DRIVE ELEMENT

(75) Inventors: Uwe Skultety-Betz, Leinfelden-Echterdingen (DE); Bjoern Haase, Stuttgart (DE); Joerg Stierle, Waldenbuch (DE); Peter Wolf, Leinfelden-Echterdingen (DE); Volker Bosch, Echterdingen (DE); Kai Renz, Leinfelden-Echterdingen (DE); Clemens Schulte, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 11/911,006

(22) PCT Filed: Jun. 30, 2006

(86) PCT No.: PCT/EP2006/063756

§ 371 (c)(1),
(2), (4) Date: Oct. 9, 2007

(87) PCT Pub. No.: WO2007/017310

PCT Pub. Date: Feb. 15, 2007

(65) Prior Publication Data

US 2008/0137060 A1    Jun. 12, 2008

(30) Foreign Application Priority Data

Aug. 8, 2005    (DE) .................. 10 2005 037 253

(51) Int. Cl.
*G01C 3/08*    (2006.01)

(52) U.S. Cl. .................................................. 356/4.01
(58) Field of Classification Search ................ 356/4.01, 356/5.01, 5.1, 5.15
See application file for complete search history.

(56) References Cited

U.S. PATENT DOCUMENTS

| 4,047,136 | A | 9/1977 | Satto |
| 4,227,164 | A | 10/1980 | Kitahara |
| 4,302,720 | A | 11/1981 | Brill |
| 5,235,454 | A | 8/1993 | Iwasaki |
| 5,815,251 | A | 9/1998 | Ehbets et al. |
| 5,831,718 | A | * 11/1998 | Desai et al. ................. 356/5.01 |
| 7,221,435 | B2 | 5/2007 | Stierle et al. |
| 2003/0021873 | A1 | 1/2003 | Willits et al. |
| 2003/0184186 | A1 | 10/2003 | Fukushima et al. |
| 2004/0263825 | A1 | 12/2004 | Stierle et al. |
| 2008/0088817 | A1* | 4/2008 | Skultety-Betz et al. ..... 356/4.01 |
| 2008/0297759 | A1 | 12/2008 | Skultety-Betz et al. |

FOREIGN PATENT DOCUMENTS

DE    43 16 348    11/1994

(Continued)

*Primary Examiner*—Isam Alsomiri
(74) *Attorney, Agent, or Firm*—Michael J. Striker

(57) ABSTRACT

A distance measuring device (10) in the form of a hand-held unit includes a path (28, 34) for a measurement signal, an adjustable signaling means (36) for changing the measurement signal, and a drive unit (40) for adjusting the signaling means (36, 70). The drive unit is equipped with a static unit (52) and a drive element (46, 76) that the static unit (52) is able to directly drive to execute a movement in relation to the static unit (52). The drive element (46, 76) has the capacity to be driven into a rotation in relation to the static unit (52).

10 Claims, 4 Drawing Sheets

FOREIGN PATENT DOCUMENTS

| | | |
|---|---|---|
| DE | 195 20 167 | 12/1996 |
| DE | 198 04 050 | 8/1999 |
| DE | 198 04 059 | 8/1999 |
| DE | 102 16 476 | 10/2003 |
| DE | 10 2004 023 998 | 12/2005 |
| EP | 0 793 117 | 9/1997 |
| EP | 1 298 776 | 4/2003 |
| FR | 2 523 363 | 9/1983 |
| GB | 2 334 172 | 8/1999 |
| GB | 2 333920 | 8/1999 |
| JP | 11-174154 | 7/1999 |
| WO | 93/20458 | 10/1993 |

* cited by examiner

HAND-HELD DISTANCE MEASURING DEVICE WITH STATIC UNIT AND DRIVE ELEMENT

BACKGROUND OF THE INVENTION

The invention is based on a measuring device, in particular a distance measuring device embodied in the form of a hand-held unit.

DE 198 04 050 A1 has disclosed a distance measuring device equipped with a laser diode and a photo diode for generating and receiving an optical transmission and reception measurement signal. For calibration purposes, the distance measuring device is equipped with an adjustable reflective flap, which an actuator moves into an optical path of the transmission measurement signal during calibration, deflecting the transmission measurement signal and aiming it directly at the photo diode via a reference route.

SUMMARY OF THE INVENTION

The invention is based on a measuring device, in particular a distance measuring device embodied in the form of a hand-held unit, having a path for a measurement signal, an adjustable signaling means for changing the measurement signal, and a drive unit for adjusting the signaling means, which drive unit is equipped with a static unit and a drive element that the static unit is able to directly drive to execute a movement in relation to the static unit.

According to the present invention, the drive element has the capacity to be driven into a rotation in relation to the static unit. This makes it possible to achieve a simple, compact design of the static unit and of the drive mechanism. If the signaling means is also adjustable in rotatory fashion, then it is possible to eliminate additional translatory elements. In the adjustment of the signaling means, the signaling means can advantageously be brought into the path of the measurement signal, thus changing the measurement signal. For example, the measurement signal can be deflected, reflected, split into two other measurement signals, polarized, and/or absorbed by the signaling means. In this connection, the measurement signal can be embodied in the form of electromagnetic radiation, e.g. optical radiation, infrared radiation, radar radiation, etc., or can be embodied in the form of an ultrasonic wave. The signaling means can, for example, be embodied in the form of a beam splitter or mirror. The static unit is preferably provided to generate a magnetic or electric excitation field in order to drive the drive element.

According to another embodiment, the signaling means is supported so that it is able to pivot around a rotation axis and the drive element is supported so that it is able to rotate around the rotation axis. This advantageously permits a simple connection to be achieved between the drive element and the signaling means.

According to another related embodiment, the signaling means is rigidly connected to the drive element. This makes it possible to advantageously achieve an adjustment of the signaling means with a small number of moving parts, also making it possible to minimize an adjustment time and an energy consumption in the adjustment of the signaling means. In addition, it is advantageously possible for the signaling means to be directly connected to the drive element; in particular, it is possible for the signaling means to be fastened directly to the drive element.

If the drive element is integrally formed onto the signaling means, this makes it possible to achieve a particularly rigid connection of the drive element to the signaling means and advantageously eliminates the need for assembling the drive element with the signaling means.

In another embodiment of the invention, the signaling means has an axle that is encompassed by the static unit. This permits a compact arrangement of the signaling means and the static unit. If the signaling means has a flap-shaped element, then the axle can advantageously be integrally formed onto the flap-shaped element.

According to another related embodiment, the drive element is comprised of an annular element that is press-fitted onto the axle. This makes it possible to achieve a particularly rigid connection between the drive element and the signaling means. In addition, it is possible to achieve a simple installation of the drive element into the static unit in that the axle on which the drive element is preinstalled is situated inside the static unit.

According to one embodiment, the drive element is comprised of a permanent magnet. This makes it possible to achieve a lower weight of the drive element, thus making it possible to achieve a reduced drive energy in the adjustment of the signaling means. The permanent magnet is preferably accommodated in rotary fashion inside a ferromagnet of the static unit. In this case, a magnetic driving force exerted by the static unit is advantageously able to contactlessly drive the permanent magnet to execute a rotation, thus avoiding friction losses in the driving process.

A weight of the drive element and a drive energy during adjustment of the signaling means are further reduced by manufacturing the drive element out of a plastic-bonded magnetic material. In this connection, the drive element can preferably be manufactured out of a mixture of plastic and a ferromagnetic material, e.g. a mixture of plastic and a ferrite material. The drive element can advantageously be injection-molded onto the signaling means, e.g. onto an axle of the signaling means. If the drive element is integrally joined to the signaling means, then the signaling means itself can be manufactured out of a plastic-bonded magnetic material. The drive element is preferably supported in rotary fashion inside a ferromagnet of the static unit, thus making it possible for the static unit to drive the drive element in a contactless fashion.

If the signaling means is suspended on points, this also makes it possible to advantageously avoid friction losses in an adjustment of the signaling means.

In an advantageous modification of the invention, the drive element, in cooperation with the static unit, has at least two energetic minima and a movement path of the signaling means in a holding position is limited by a limiting means; in the holding position, the drive element is situated in front of an energetic minimum. This advantageously makes it possible to achieve at least two stable positions of the signaling means that can each be associated with an energetic minimum of the drive element. These limiting means also make it possible for a position of the signaling means, which is advantageous for a particular use, to be precisely achieved during an adjustment of the signaling means. In addition, it is possible to counteract an undesired movement of the signaling means out of the holding position, e.g. when the measuring unit is being moved, in a particularly effective fashion for example by the signaling means being pressed against the limiting means.

In this connection, a simple embodiment of the limiting means can be achieved by embodying the limiting means in the form of a stop element. If the path for the measurement signal is situated in a signal conduit, then the stop element can be advantageously comprised of a wall or a shape molded onto the signal conduit.

A prevention of an undesired movement of the signaling means out of the holding position can be further improved by the fact that the signaling means that is situated in the holding position is held in the holding position by a holding force.

BRIEF DESCRIPTION OF THE DRAWINGS

Other advantages ensue from the following description of the drawings. The drawings show exemplary embodiments of the invention. The drawings, the description, and claims contained numerous features in combination. Those skilled in the art will also suitably consider the features individually and unite them in other meaningful combinations.

DETAILED DESCRIPTION OF THE EXEMPLARY EMBODIMENTS

Figure 1:
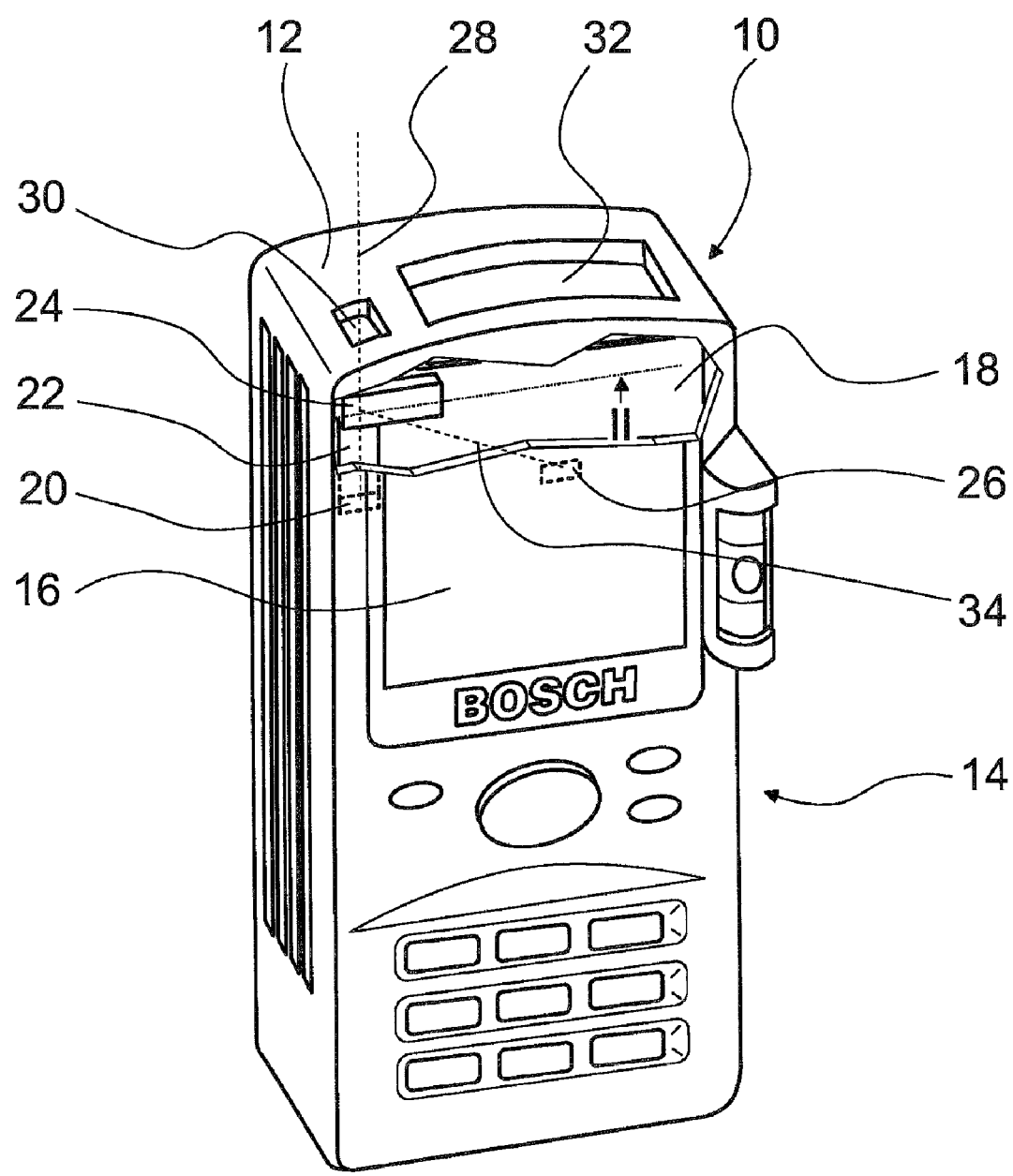
FIG. 1 shows a distance measuring device equipped with a transmitting unit, receiving unit, and deflecting unit.

FIG. 1 shows a measuring device embodied in the form of a distance measuring device 10. It has a housing 12, actuating elements 14 for switching the distance measuring device 10 on and off and for starting and configuring a measurement procedure, as well as a display 16. A support element 18 inside the housing 12 supports a transmitting unit 20, embodied in the form of a laser diode, for generating an optical transmission measurement signal, a light conduit 22, a deflecting unit 24 for deflecting the transmission measurement signal, and a receiving unit 26, embodied in the form of a photodiode, for receiving a reception measurement signal. In order to measure a distance between the distance measuring device 10 and a remote object, during operation of the distance measuring device 10, the transmission unit 20 sends a transmission measurement signal along a path 28 through a set of transmission optics 30. The transmission measurement signal reflected by a surface of the remote object travels through a set of reception optics 32 and is received by the receiving unit 26 in the form of a reception measurement signal. Through a phase comparison of the transmission measurement signal and the reception measurement signal, it is possible to determine a light travel time and to use the speed of light to ascertain the distance sought. In order to compensate for travel times that are independent of the distance and, for example, occur with the production of the transmission measurement signal and/or in a processing of the reception measurement signal, a reference measurement is carried out before a distance measurement. In this case, the deflecting unit 24 deflects the transmission measurement signal and aims it directly at the receiving unit 26 via a known reference route along a path 34.

Figure 2A:
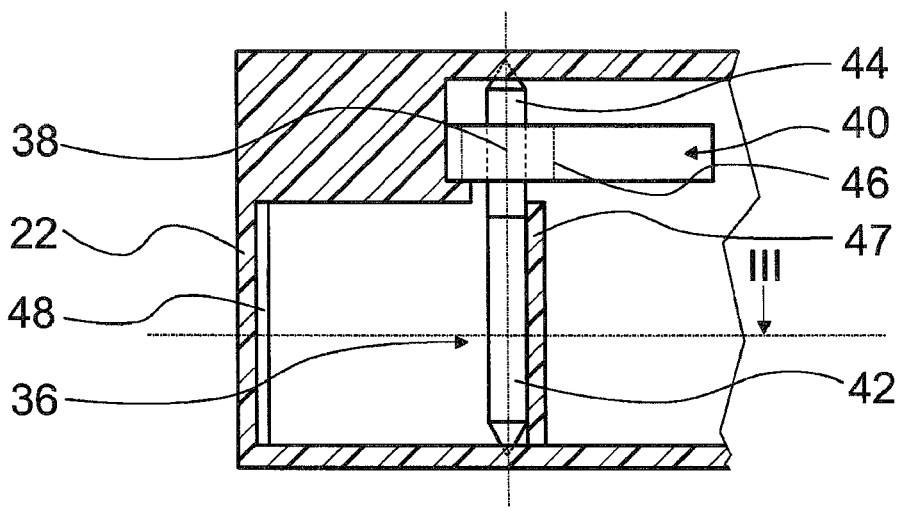
FIG. 2a shows the deflecting unit in a sectional view, with a signaling means in a first holding position and a drive unit.
Figure 2B:
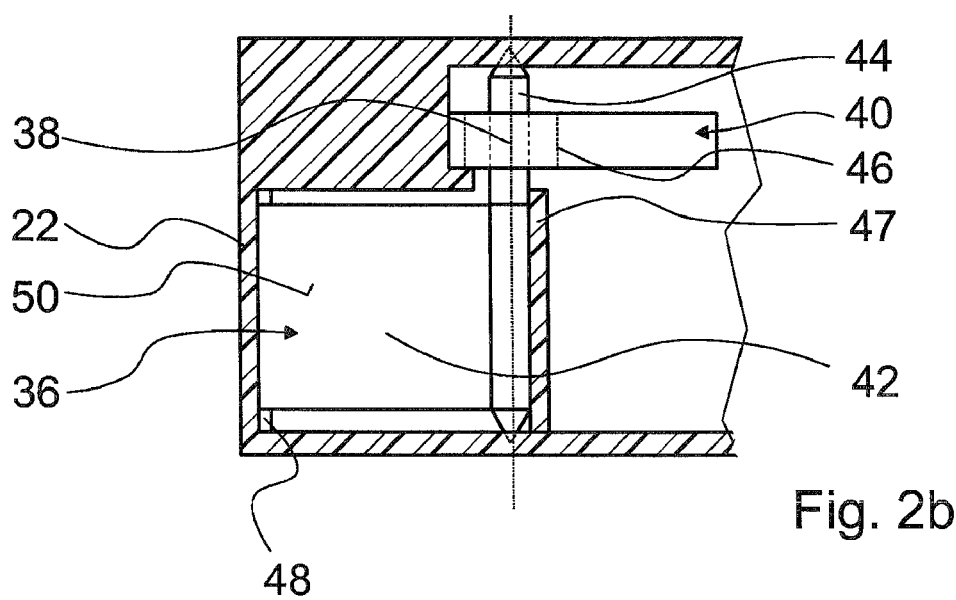
FIG. 2b shows the deflecting unit with the signaling means in a second holding position.

FIGS. 2a and 2b show the deflecting unit 24 in a sectional view perpendicular to the path 28 (FIG. 1). These figures show the light conduit 22, a signaling means 36 that is suspended on points so that it is able to rotate around a rotation axis 38, and a drive unit 40 for driving a rotation of the signaling means 36 around the rotation axis 38. The signaling means 36 has a flap-shaped element 42 onto which an axle 44 is integrally formed. The drive unit 40 has a drive element 46, which is embodied in the form of an annular element and is press-fitted onto the axle 44. As a result, the drive element 46 is rigidly connected to the signaling means 36 and is supported so that it is able to rotate around the rotation axis 38. On the one hand, a movement of the signaling means 36 around the rotation axis 38 is limited in a first holding position by a limiting means 47 embodied in the form of a stop element and on the other hand, its movement is limited in a second holding position by a limiting means 48 embodied in the form of a stop element. In FIG. 2a, the signaling means 36 is situated in the first holding position in which it rests against the limiting means 47. In this first holding position, a generated transmission measurement signal is sent out through the transmission optics 30 (FIG. 1), thus permitting a distance measurement to be carried out. To carry out a reference measurement, the drive unit 40 moves the signaling means 36 from the first holding position into the second holding position. In this second holding position, the signaling means 36, as shown in FIG. 2b, rests against the limiting means 48. The flap-shaped element 42 has a surface 50 against which the transmission measurement signal is reflected. The surface 50 can have a surface structure such as a pyramid structure. This can reduce an intensity of the transmission measurement signal aimed at the receiving unit 26 during a reference measurement, thus preventing an overload of the receiving unit 26. Alternatively or in addition, the surface 50 can attenuate the transmission measurement signal through absorption, thus also making it possible to reduce an intensity of the transmission measurement signal received by the receiving unit 26 during a reference measurement.

Figure 3:
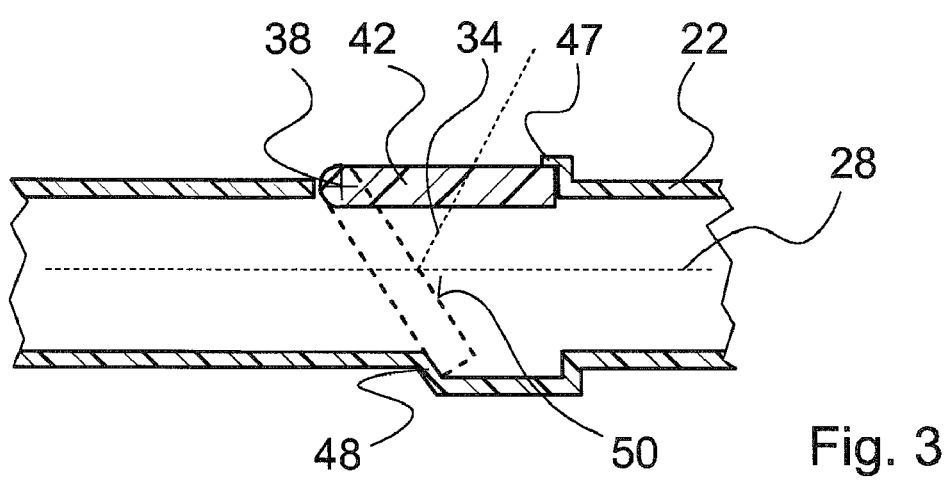
FIG. 3 shows the signaling means in another sectional view.

FIG. 3 is another sectional view depicting the arrangement of the signaling means 36 in the light conduit 22 in both of the holding positions. During a reference measurement, the surface 50 of the signaling means 36 situated in the second holding position deflects a transmission measurement signal, directing the transmission measurement signal via the reference route along the path 34 to the receiving unit 26 (FIG. 1).

Figure 4A:
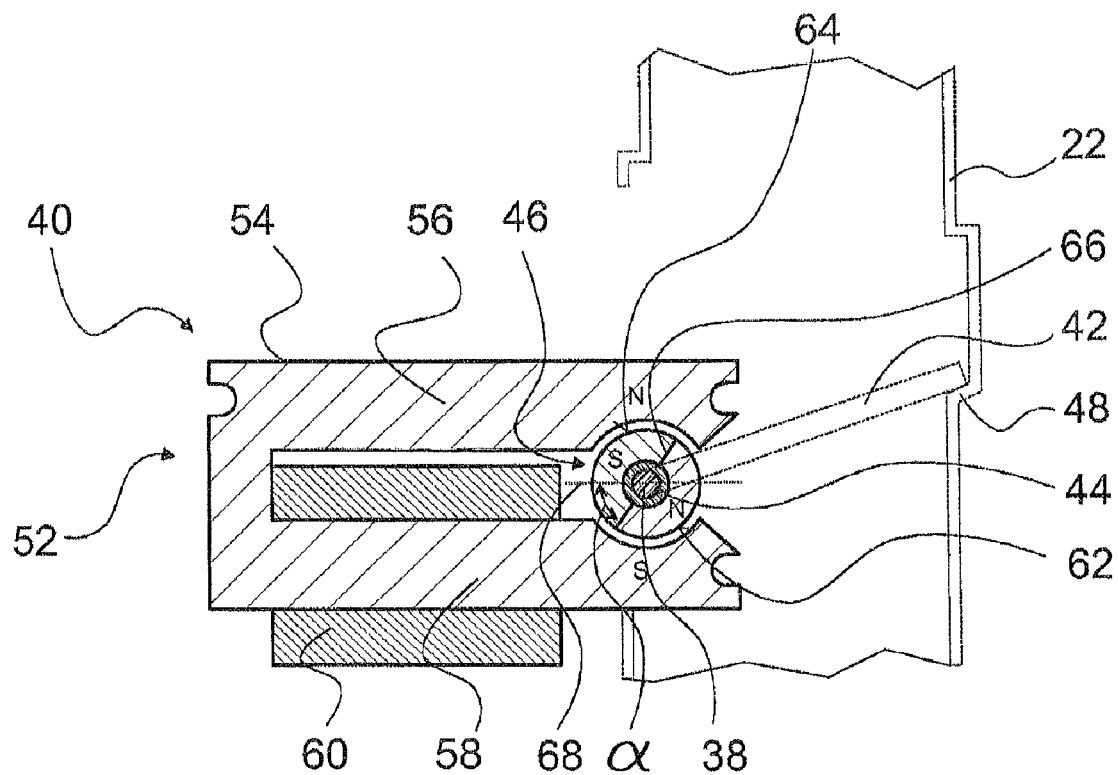
FIG. 4a shows the drive unit with a static unit and a drive element in the second holding position.
Figure 4B:
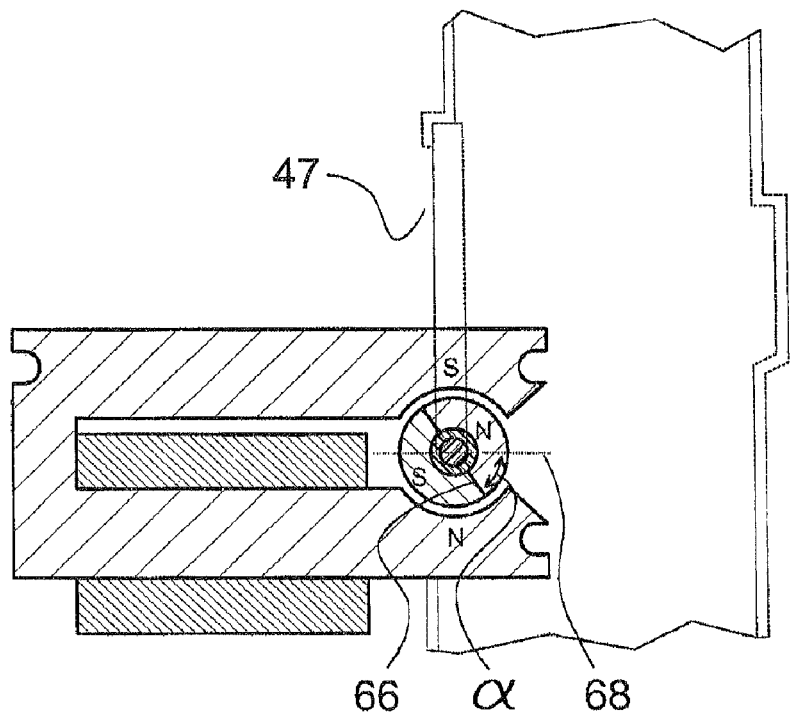
FIG. 4b shows the drive unit with the drive element in the second holding position.

FIGS. 4a and 4b show sectional views of the drive unit 40. This drive unit 40 has a static unit 52 that has an iron core 54 with two legs 56, 58, a winding 60, and the drive element 46 embodied in the form of an annular element that is press-fitted onto the axle 44 of the signaling means 36. The static unit 52 encompasses the axle 44 and the drive element 46. The annular element embodied in the form of the drive element 46 is composed of a permanent magnet. In this case, the circumference surface of the annular element is composed of two sections 62, 64 that each have a different north/south magnetic polarity. For the sake of clarity, this polarity, in accordance with the annular element in the drawing, is divided into two imaginary parts that are depicted with different cross-hatching and are divided by an imaginary interface boundary 66. The legs 56 and 58 of the iron core 54 likewise each have a different north/south magnetic polarity. The drive element 46 is therefore situated in a magnetic field of the static unit 52. In FIG. 4a, dashed lines are used to depict the flap-shaped element 42 of the signaling means 36 when it is in the second holding position in which it rests against the limiting means 48. In this second holding position, the imaginary interface boundary 66 of the drive element 46 forms an angle α with an axis 68. In the above-described configuration of the magnetic polarities of the static unit 52 and the drive element 46, in the second holding position, the drive element 46 is situated in the magnetic field of the static unit 52 in front of an energetic minimum that would be achieved at an angle of α=0° and therefore has a potential energy. This potential energy causes the static unit 52 to exert a force on the drive element 46; due to the rigid connection of the drive element 46 to the signaling means 36, this force is transmitted to the signaling means 36. As a result, in the second holding position, the force presses the signaling means 36 against the limiting means 48 and holds it in this second holding position.

In order to move the signaling means 36 into the first holding position, the polarities of the legs 56, 58 are reversed by a current pulse of the winding 60, which causes the static unit 52 to drive the drive element 46 into a rotation around the rotation axis 38 until the signaling means 36 comes into contact with the limiting means 47. In FIG. 4*b*, the signaling means 36 is depicted with dashed lines in the first holding position. In this first holding position, the interface boundary 66 forms an angle α with the axis 68. The drive element 46 is situated in the magnetic field of the static unit 52 in front of an energetic minimum that would be achieved at the angle α=0°. As described above for the second holding position in conjunction with FIG. 4*a*, a force holds the signaling means 36 in the first holding position.

In one embodiment, it is conceivable for the drive element 46 that is embodied in the form of an annular element to be composed of more than two sections situated one after the other in the circumference direction, with one section being of one magnetic polarity and the neighboring section being of a different magnetic polarity. This makes it possible to achieve more than two energetic minima for the drive element 46 in a magnetic field generated by the static unit 52, each of which can be associated with a stopping position of the signaling means 36.

It is also conceivable for the drive element 46 to be manufactured of a plastic-bonded magnetic material, e.g. a plastic-bonded ferrite material and for it to be injection-molded onto the axle 44.

Figure 5:
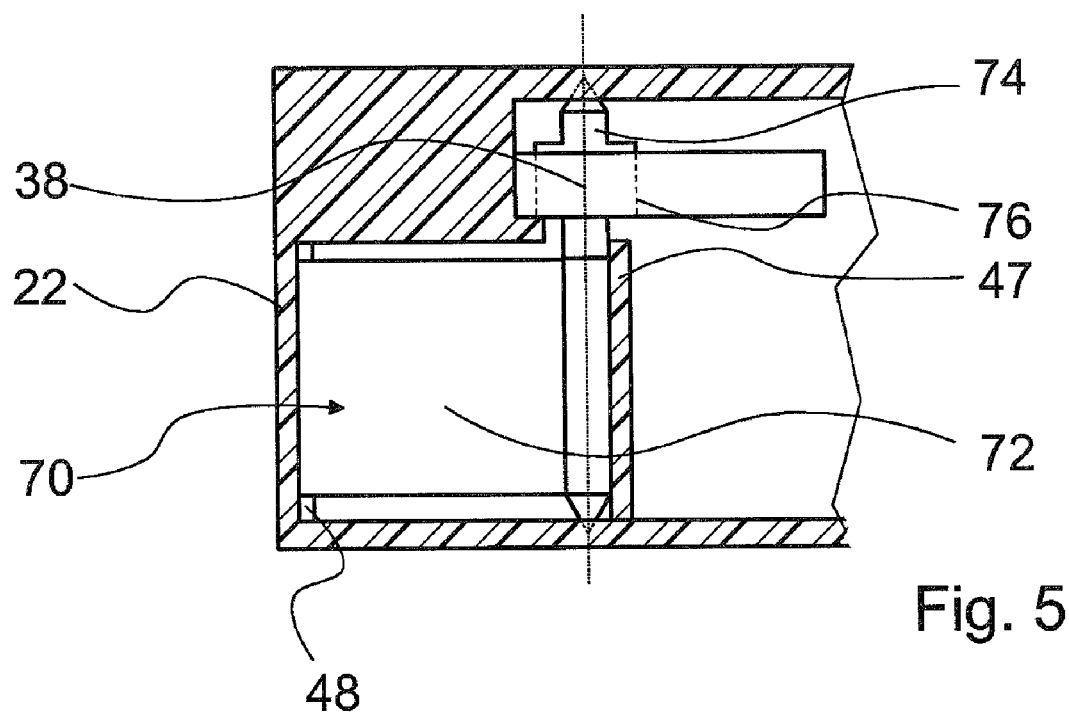
FIG. 5 shows the deflecting unit with a drive element integrally formed onto a signaling means.

FIG. 5 shows the deflecting unit 24 that is provided with an alternative signaling means 70. It has a flap-shaped element 72, which has an axle 74 integrally formed onto it. A drive element 76 is integrally formed onto the axle 74. The signaling means 70 is manufactured out of a plastic-bonded ferrite material. During the manufacturing process, the plastic is mixed with a powder that contains the ferrite material and the signaling means is produced by means of a known injection-molding process.

What is claimed is:

1. A distance measuring device (10) embodied in the form of a hand-held unit, comprising:
    a path (28, 34) for a measurement signal;
    an adjustable signaling means (36) for changing the measurement signal; and
    a drive unit (40) for adjusting the signaling means (36, 70), wherein said drive unit is equipped with a static unit (52) and a drive element (46, 76) arranged so that said static unit (52) acts on the drive element (46, 76) and thereby the drive element (46, 47) is driven into a rotation in relation to the static unit (52) and drives the signaling means (36), wherein the signaling means (36) is pivotable about an axis of rotation (38), wherein said signaling means has at least two stable positions, and wherein the drive element (46, 76) is supported so as to be rotatable about the axis of rotation (38) and to rotate the signaling means about the axis of rotation (38).

2. The measuring device as recited in claim 1, wherein the signaling means (36, 70) is rigidly connected to the drive element (46, 76).

3. The measuring device as recited in claim 2, wherein the drive element (76) is integrally formed onto the signaling means (70).

4. The measuring device as recited in claim 1, wherein the signaling means (36, 70) has an axle (44, 74) that is encompassed by the static unit (52).

5. The measuring device as recited in claim 4, wherein the drive element (46) is comprised of an annular element that is press-fitted onto the axle (44).

6. The measuring device as recited in claim 1, wherein the drive element (76) is manufactured out of a plastic-bonded magnetic material.

7. The measuring device as recited in claim 1, wherein the signaling means (36, 70) is suspended on points.

8. The measuring device as recited in claim 1, wherein the drive element (46), in cooperation with the static unit (52), has at least two energetic minima and a movement path of the signaling means (36) in a holding position is limited by a limiting means (47, 48), and wherein in the holding position, the drive element (46) is situated in front of an energetic minimum.

9. The measuring device as recited in claim 8, wherein the limiting means (47, 48) is embodied in the form of a stop element.

10. The measuring device as recited in claim 8, wherein the signaling means (36) that is situated in the holding position is held in the holding position by a holding force.

\* \* \* \* \*